H. HAHN.
VEGETABLE PEELING MACHINE.
APPLICATION FILED APR. 15, 1912.

1,053,094.

Patented Feb. 11, 1913.

WITNESSES:
A. J. Henry
Willard S. Fleming

INVENTOR.
Herman Hahn.
BY
Baldwin Vale
ATTORNEY.

UNITED STATES PATENT OFFICE.

HERMAN HAHN, OF SAN FRANCISCO, CALIFORNIA, ASSIGNOR OF ONE-FOURTH TO WILLIAM N. McCAW, ONE-FOURTH TO ALEXANDER J. STERGIOS, AND ONE-FOURTH TO WILLARD S. FLEMING, ALL OF SAN FRANCISCO, CALIFORNIA.

VEGETABLE-PEELING MACHINE.

1,053,094.   Specification of Letters Patent.   Patented Feb. 11, 1913.

Application filed April 15, 1912. Serial No. 690,850.

*To all whom it may concern:*

Be it known that I, HERMAN HAHN, a citizen of the United States, and residing at 856 Union street, in the city of San Francisco, county of San Francisco, and State of California, have invented certain new and useful Improvements in Vegetable-Peeling Machines; and I do hereby declare the following to be a full, clear, and exact description of the said invention, such as will enable others skilled in the art to which it most nearly appertains to make, use, and practise the same.

This invention relates to improvements in vegetable peeling machines.

Attention is directed to my United States Patent Number 910,374, issued January 19 1909, upon which the present invention is an improvement.

The object sought to be accomplished is to produce a quick acting machine which will remove only the peeling or skin of tuberous vegetables without injuring the edible portion of the vegetable.

Broadly stated the invention consists of an inclosed drum with a removable head, and having a series of spring actuated brushes mounted on the inner circumference of the drum. A revolving cylinder or rotor having circumferential brushes coöperating with the first mentioned brushes; and a spring operated traveler pivoted on the rotor, the function of which is to positively cause the vegetables to travel between the two sets of brushes; inlet and outlet doors hinged to the circumference of the drum to receive and eject the vegetables; means for introducing a stream of water into the drum; and a direct motor drive mechanism adapted to rotate the inner cylinder.

Figure 1:
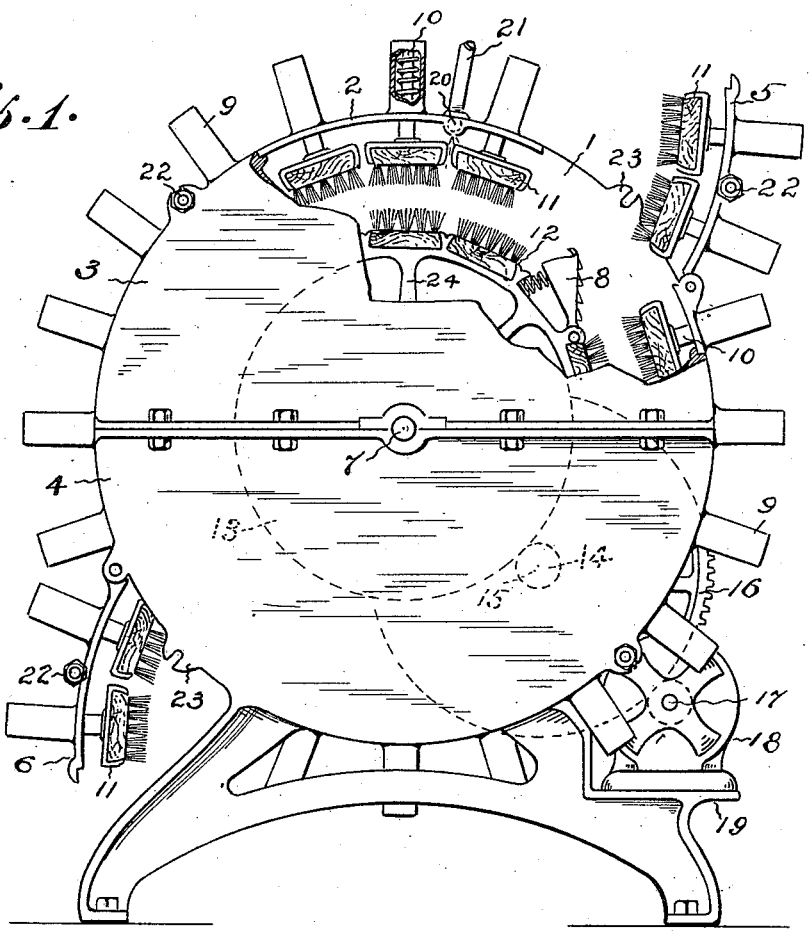
Figure 2:
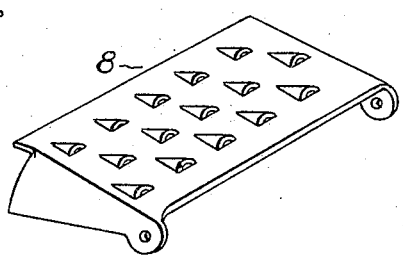

In the drawings: Figure 1 is a side elevation illustrating a vegetable peeler constructed in accordance with this invention, portions being broken away in cross section to disclose the inner mechanisms. Fig. 2 is an isometrical perspective of the traveler.

In detail the construction consists of the inclosing drum with the head 1 and the circumferential wall 2 cast integral. The semicircular plates 3 and 4 forming the opposite head are removable to give free access to the interior of the drum. The inlet door 5 and outlet door 6 are hinged to the circumferential wall and swing outward. When these doors are closed the inner circumference of the drum presents a continuous circle of resilient brushes.

The revolving cylinder is fixed upon the drive shaft 7 journaled in the heads of the drum. The rim of the rotor 24 is provided with a series of dovetailed slots 12 adapted to receive brushes with similarly shaped backs. At intervals the rim of the rotor is provided with the pivoted travelers 8; consisting of a plate of metal having serrations or teeth upset from the body thereof, and adapted to engage any vegetables lodging between the brushes. Ordinarily the friction of the brushes on the rotor is sufficient to cause the vegetables to progress freely; however an occasional large object or an accumulation of small ones will tend to jam between the two sets of brushes unless the traveler 8 is provided.

The circumferential wall 2 is provided with the radial tubes 9 into which the stems 10 of the yoke sockets 11 are resiliently secured. The dovetail shape of the sockets 11 and 12 makes it possible to readily change or renew any worn or unsuitable brushes quickly. The ready access to the interior of the machine, and the easy changing of the brushes are prime features of this invention. It often happens that a brush will prove defective and repair or replacement be necessary. Different classes of products require various grades of brushes. The construction of the present type of machine makes substitution of brushes a simple matter, rendering the machine adaptable to a wide range of uses.

The rotor is driven by a train of gears indicated in dotted lines on the opposite side of the machine. The driving gear comprises the gear 13 fixed upon the shaft 7 and enmeshed with driving pinion fixed upon naled upon the stud 15 on the head of the drum, and driven by the integral gear 16 enmeshed with driving pinion fixed upon the shaft 17 of the motor 18, which is mounted upon the bracket 19 formed on the base of the machine. The cross spray pipe 20 is adapted to distribute water received from the service pipe 21.

Thus assembled the machine is self contained and requires small operating space, rendering it adaptable for potato chip factories, restaurants, on board ships or like places where space is limited.

The plates 3 and 4 are secured to the drum by the bolts and nuts 22 fixed upon the circumferential wall 2, and adapted to engage the lugs 23 formed on the plates.

Having thus described this invention what is claimed and desired to secure by Letters Patent is:

1. A peeling machine comprising an inclosed drum having brushes upon its inner circumference; a rotor having brushes upon its rim; and a traveler pivoted upon said rotor.

2. A peeling machine comprising an inclosed drum having brushes resiliently mounted upon its inner circumference; a rotor having brushes mounted upon its rim; and a traveler pivoted upon the rim of the rotor.

3. A peeling machine comprising an inclosed drum having resilient brush sockets mounted upon its inner circumference; a rotor having brush sockets upon its rim; a traveler pivoted on said rotor; and inlet and outlet doors hinged to said drum.

4. A peeling machine comprising an inclosed drum having removable side plates, a rotor having peripheral sockets, brushes held in said sockets, a traveler pivoted to said rotor, and additional brushes surrounding said rotor and supported by the interior of the drum.

5. A peeling machine comprising an inclosed drum having brushes upon its inner circumference, a rotor having brushes upon its periphery and a pivoted plate carried by said rotor and provided with serrations.

In testimony whereof, I have hereunto set my hand this 24th day of February, 1912.

HERMAN HAHN.

Witnesses:
A. J. HENRY,
B. E. VAIL.

---

Copies of this patent may be obtained for five cents each, by addressing the "Commissioner of Patents, Washington, D. C."